US010374493B2

(12) United States Patent
Kobayashi et al.

(10) Patent No.: US 10,374,493 B2
(45) Date of Patent: Aug. 6, 2019

(54) VEHICLE-USE ROTATING ELECTRIC MACHINE

(71) Applicant: Mitsubishi Electric Corporation, Tokyo (JP)

(72) Inventors: Yuzuru Kobayashi, Tokyo (JP); Masao Akiyoshi, Tokyo (JP); Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 217 days.

(21) Appl. No.: 15/502,079

(22) PCT Filed: Oct. 21, 2014

(86) PCT No.: PCT/JP2014/077904
§ 371 (c)(1),
(2) Date: Feb. 6, 2017

(87) PCT Pub. No.: WO2016/063337
PCT Pub. Date: Apr. 28, 2016

(65) Prior Publication Data
US 2017/0222522 A1    Aug. 3, 2017

(51) Int. Cl.
*H02K 11/00* (2016.01)
*H02K 11/04* (2016.01)
(Continued)

(52) U.S. Cl.
CPC ........... *H02K 11/046* (2013.01); *H02K 5/225* (2013.01); *H02K 11/05* (2016.01); *B60R 16/03* (2013.01);
(Continued)

(58) Field of Classification Search
CPC .............................. H02K 11/046; H02K 5/225
(Continued)

(56) References Cited

U.S. PATENT DOCUMENTS 6,160,335 A * 12/2000 Ishida ...................... H02K 3/50
310/64
8,692,427 B2 * 4/2014 Tanaka ................ H02K 11/046
310/43
(Continued)

FOREIGN PATENT DOCUMENTS

CN    202798292 U    3/2013
EP    0 969 583 A1    1/2000
(Continued)

OTHER PUBLICATIONS

Communication dated Jul. 4, 2018, from the State Intellectual Property Office of People's Republic of China in counterpart Application No. 201480081659.2.
(Continued)

*Primary Examiner* — Hanh N Nguyen
(74) *Attorney, Agent, or Firm* — Sughrue Mion, PLLC; Richard C. Turner

(57) ABSTRACT

A configuration of a rectifying device configuring a vehicle-use rotating electric machine is such that when a lead drawn out from a stator winding is inserted into a through hole of a rear bracket forming a casing, a periphery of the lead is enclosed, and the through hole sealed, by a tubular member extended from a main body portion of a terminal block, and the through hole not blocked by the tubular member is sealed by a stopper portion extended in the same way from a main body portion of the terminal block. Even when the number of leads drawn out is reduced, standardization of the rear bracket is carried out by the through hole (3a) of the rear bracket being sealed by the stopper portion.

10 Claims, 12 Drawing Sheets

(51) Int. Cl.
*H02K 5/22* (2006.01)
*H02K 11/05* (2016.01)
*B60R 16/03* (2006.01)
*H02K 5/10* (2006.01)
*H02K 9/06* (2006.01)

(52) U.S. Cl.
CPC ............ *B60Y 2400/60* (2013.01); *H02K 5/10* (2013.01); *H02K 9/06* (2013.01)

(58) Field of Classification Search
USPC .................................................. 310/68 D, 71
See application file for complete search history.

(56) References Cited

U.S. PATENT DOCUMENTS

| | | |
|---|---|---|
| 2002/0136041 A1 | 9/2002 | DeNardis |
| 2003/0147212 A1 | 8/2003 | Ogi |
| 2007/0046114 A1* | 3/2007 | Kondo ................. H01L 25/115 310/68 D |
| 2008/0061641 A1* | 3/2008 | Koumura ............. H02K 11/046 310/71 |
| 2009/0134749 A1* | 5/2009 | Nakamura ........... H02K 11/046 310/68 D |
| 2014/0152130 A1 | 6/2014 | Shimano et al. |
| 2014/0225461 A1 | 8/2014 | Ohashi et al. |

FOREIGN PATENT DOCUMENTS

| | | |
|---|---|---|
| JP | 2003-224953 A | 8/2003 |
| JP | 2006-115695 A | 4/2006 |
| WO | 2013/069153 A1 | 5/2013 |

OTHER PUBLICATIONS

Communication dated May 7, 2018, from the European Patent Office in counterpart European Application No. 14904454.7.
International Search Report of PCT/JP2014/077904, dated Dec. 16, 2014.
Communication dated Jan. 21, 2019 from the State Intellectual Property Office of the P.R.C.in application No. 201480081659.2.

* cited by examiner

VEHICLE-USE ROTATING ELECTRIC MACHINE

CROSS REFERENCE TO RELATED APPLICATIONS

This application is a National Stage of International Application No. PCT/JP2014/077904 filed Oct. 21, 2014, the contents of all of which are incorporated herein by reference.

TECHNICAL FIELD

The present invention relates to a vehicle-use rotating electric machine such as a vehicle-use alternating current generator, and in particular, relates to a structure of a rectifying device that configures a vehicle-use rotating electric machine.

BACKGROUND ART

An existing vehicle-use alternating current generator is such that a rectifying device is attached to an outer side end face of a rear bracket, and a terminal block is configured there. Further, leads drawn out from a stator winding are connected to terminals of the terminal block via through holes of the rear bracket, whereby the rectifying device and stator winding are electrically connected. Because of this, tubular members for guiding the leads drawn out from the stator winding to an appropriate position are disposed in the terminal block when assembling, and the tubular members are inserted into the through holes of the rear bracket (for example, refer to Patent Document 1).

CITATION LIST

Patent Literature

Patent Document 1: International Publication No. WO2013/069153 A1

SUMMARY OF INVENTION

Technical Problem

However, when the number of leads drawn out from the stator winding is reduced owing to a change in stator specifications or the like, a tubular member positioned in a place in which an eliminated lead has originally been inserted becomes unnecessary due to losing the function thereof, and is removed from the terminal block. Because of this, it is supposed that a through hole of the rear bracket in a place from which an unnecessary tubular member is removed is blocked by the rear bracket being overlaid, and used.

A reason for blocking a through hole of the rear bracket remaining in a portion wherein a tubular member has been removed from the terminal block when the number of leads is reduced owing to a change in specifications is to prevent a leak or reverse flow of cooling air from the through hole, thereby obtaining a cooling performance as designed. When, provisionally, a through hole of the rear bracket remains unblocked, a problem occurs in that cooling air sucked in by a rotor fan leaks from the remaining through hole, and is not fed along a path as designed. Also, design is such that cooling air sucked in by the rotor fan and flowing as far as a vicinity of the fan is deviated in a centrifugal direction by the fan, cools a coil end of the stator winding, and is discharged to the exterior, but when there is a through hole remaining in the rear bracket, a problem occurs in that cooling air flowing as far as a vicinity of the fan flows backward through the through hole, because of which the cooling air is not fed along a path as designed.

Therefore, due to the heretofore described reasons, there are problems in that a product having specifications wherein the number of leads drawn out from the stator winding is reduced is such that the rear bracket needs to be newly fabricated, resulting in an increase in product cost, and common use of the rear bracket, that is, standardization of the rear bracket, cannot be achieved with specifications wherein the number of leads is changed.

Also, when the rear bracket is used in a form wherein a through hole thereof is blocked in a portion wherein a lead has been eliminated, the product weight increases by the weight of the material used for the blocking, and material expenses are incurred, which is a problem in terms of reducing weight and reducing manufacturing cost.

The invention, having been contrived in order to resolve the heretofore described problems, has an object of providing a vehicle-use electric rotating machine such that, by a through hole of a rear bracket being sealed by a stopper portion extended from a terminal block, cooling air is prevented from leaking or flowing backward from the through hole, cooling performance is secured as designed, and the rear bracket can be commonly used.

Solution to Problem

A vehicle-use rotating electric machine according to the invention includes a rotor rotatably supported inside a casing (including a rear bracket), a stator supported by the casing and disposed so as to enclose the rotor, and a rectifying device, disposed on an outer side on one axial direction side of the casing, that rectifies alternating current power generated in the stator, wherein the rectifying device has a terminal block necessary for electrical connection with a stator winding configuring the stator, the terminal block has a tubular member and a stopper portion extended from a main body portion of the terminal block and inserted in a through hole formed in the casing, thereby sealing the through hole in cooperation, the tubular member covers a periphery of a lead of the stator winding inserted through the through hole and guides an insertion of the lead, and the stopper portion seals a region of the through hole of the casing not blocked by the tubular member.

Advantageous Effects of Invention

According to the vehicle-use rotating electric machine of the invention, a configuration adopted is such that a through hole of a casing is sealed by cooperation between a tubular member and stopper portion extended from a main body portion of a terminal block, because of which cooling air can be prevented from leaking or flowing backward from the through hole, and cooling performance can be secured. Also, even when the number of terminals differs depending on the model, an aperture region of the through hole not blocked by the tubular member covering a periphery of a lead can be sealed by the stopper portion, whereby a common casing can be utilized.

Objects, characteristics, aspects, and advantages of the invention other than those heretofore described will be

DESCRIPTION OF EMBODIMENTS

First Embodiment

Hereafter, using FIG. 1 to FIG. 8, a description will be given of a vehicle-use rotating electric machine 1 according to a first embodiment of the invention. The description will be given with the same reference signs assigned to identical or corresponding members and regions in each drawing. In the first embodiment of the invention, a vehicle-use alternating current generator is shown as an example of the vehicle-use rotating electric machine 1.

Firstly, a basic structure of the vehicle-use rotating electric machine 1 of the invention will be described.

Figure 1:
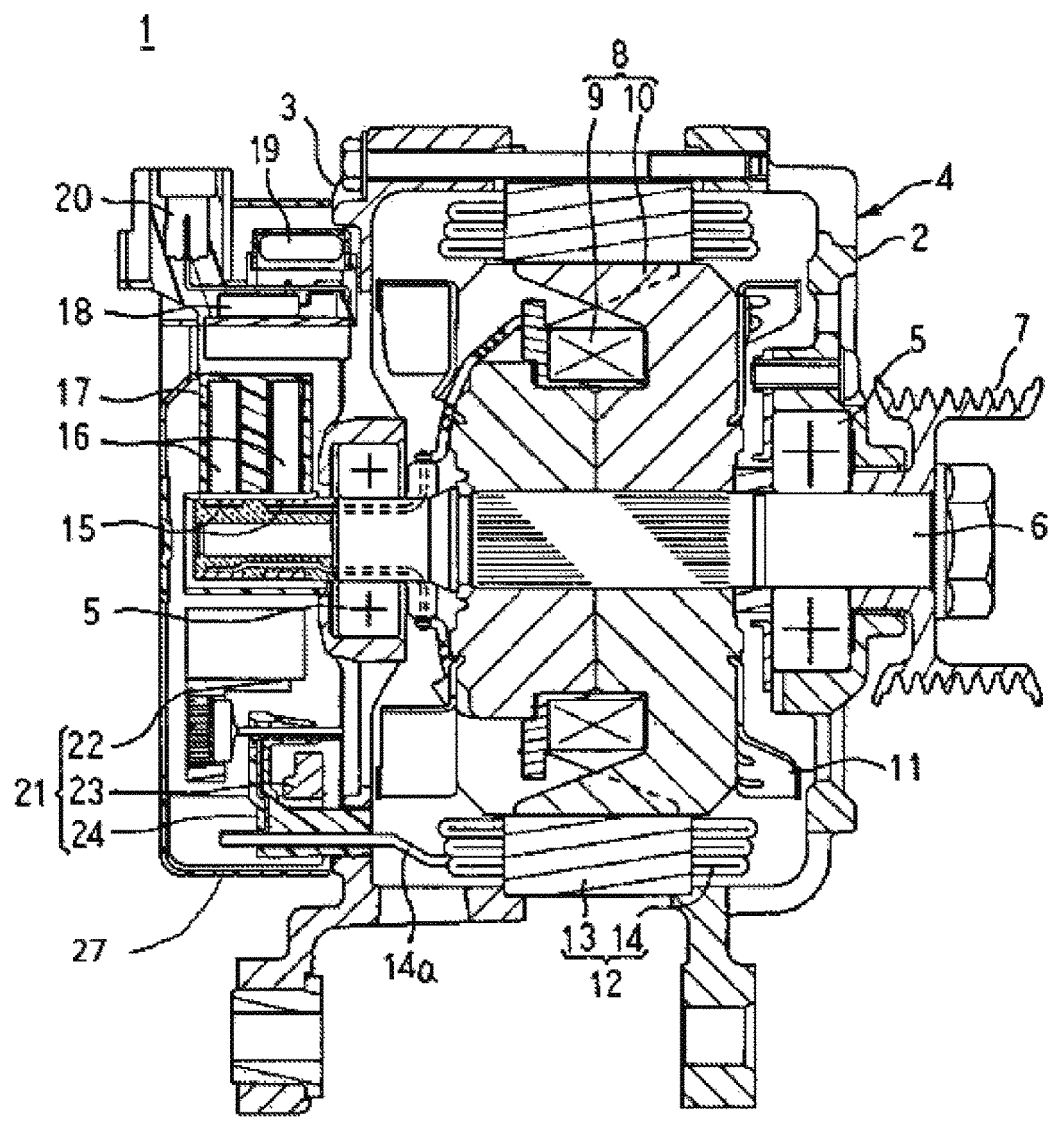
FIG. 1 is a longitudinal sectional view showing a vehicle-use rotating electric machine according to a first embodiment of the invention.
Figure 2:
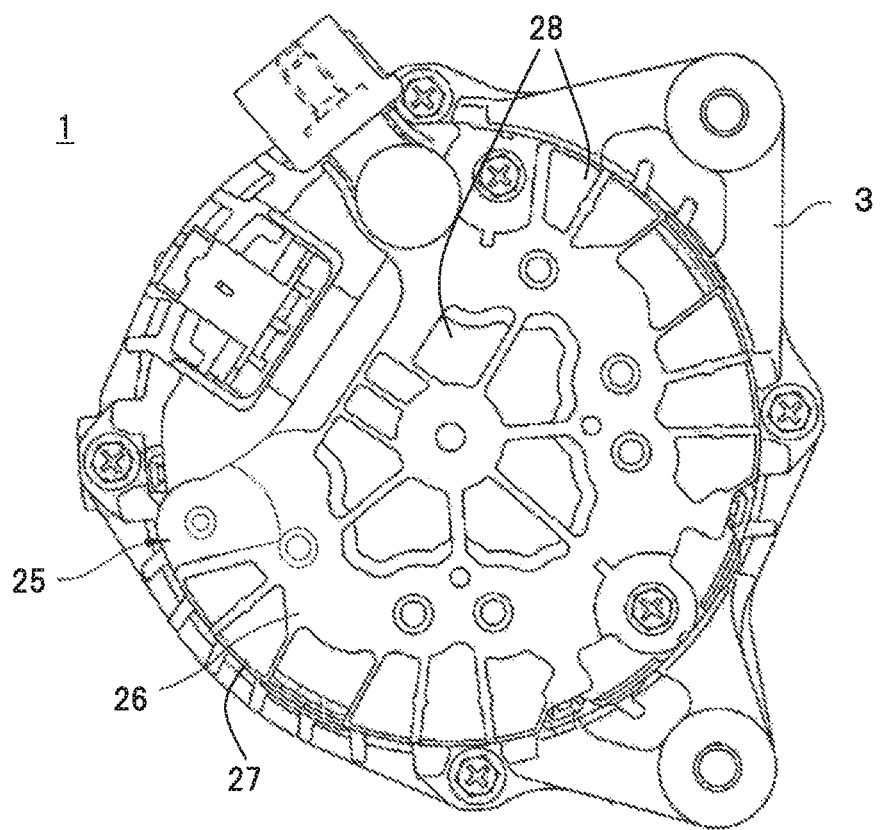
FIG. 2 is a rear side end face view showing the vehicle-use rotating electric machine according to the first embodiment of the invention.
Figure 3:
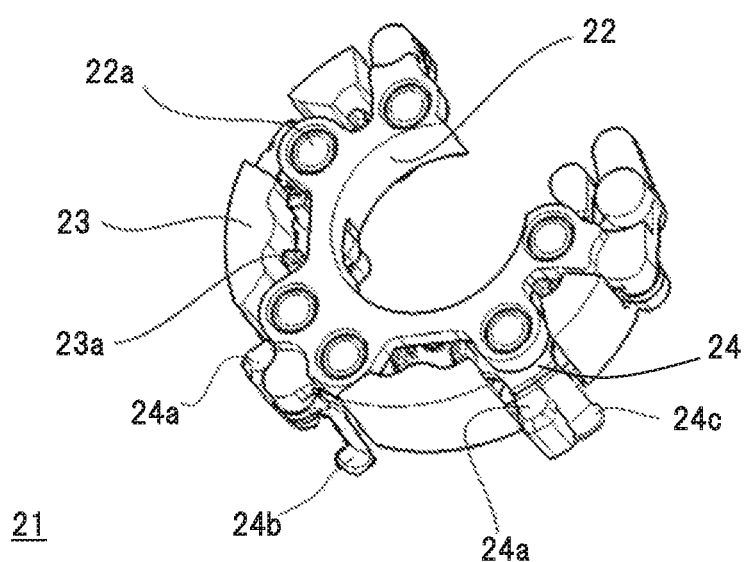
FIG. 3 is a perspective view showing a rectifying device of the vehicle-use rotating electric machine according to the first embodiment of the invention.
Figure 4:
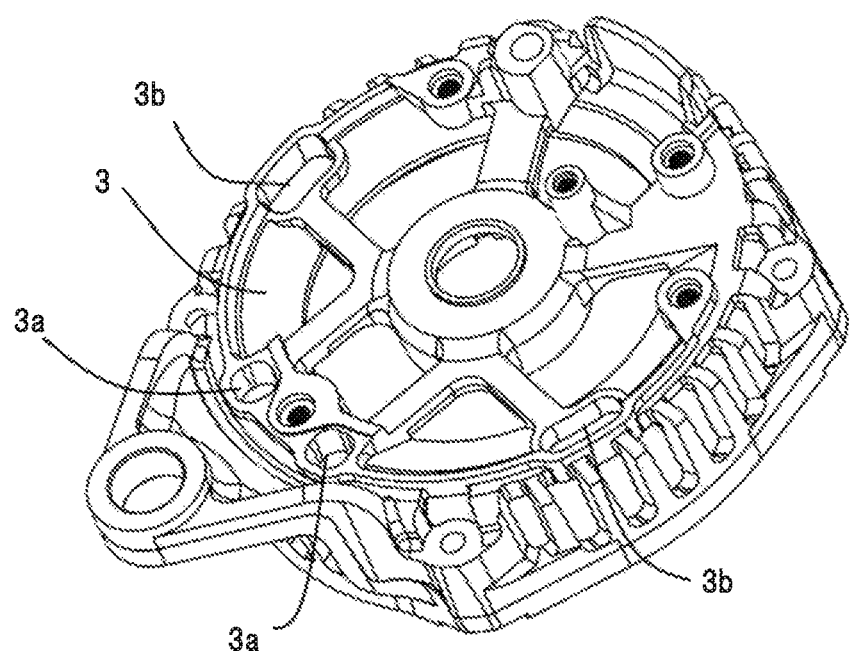
FIG. 4 is a perspective view showing a rear bracket configuring a casing of the vehicle-use rotating electric machine according to the first embodiment of the invention.

FIG. 1 is a longitudinal sectional view showing the vehicle-use rotating electric machine 1 according to the first embodiment of the invention, and shows a cross-section in an axial direction. FIG. 2 is a rear side end face view of the vehicle-use rotating electric machine 1 of FIG. 1, and shows an end face perpendicular to the axial direction. FIG. 3 is a perspective view showing a rectifying device 21 that configures the vehicle-use rotating electric machine 1 of the invention. FIG. 4 is a perspective view showing a rear bracket 3 on which the rectifying device 21 of FIG. 3 is mounted.

In FIG. 1 and FIG. 2, the vehicle-use rotating electric machine 1 includes the following kinds of component. Firstly, a casing 4 formed of an aluminum front bracket 2 and the rear bracket 3, each of which is of an approximate bowl form. Further, a shaft 6 rotatably supported by the casing 4 via a pair of bearings 5. A pulley 7 fixed to an end portion of the shaft 6 extending from the front side of the casing 4. A rotor 8 fixed to the shaft 6 and disposed inside the casing 4. A fan 11 fixed to both end faces in an axial direction of the rotor 8. A stator 12 fixed to the casing 4 so as to enclose the rotor 8. A pair of slip rings 15, fixed to an extension portion of the shaft 6 extending to the rear side of the casing 4, that supply current to the rotor 8. A pair of brushes 16 that slide on a surface of each slip ring 15. A brush holder 17 that houses the brushes 16. A voltage regulator 19, attached to a heatsink 18 disposed on an outer diameter side of the brush holder 17, that regulates the magnitude of alternating current voltage generated in the stator 12. A connector 20, formed integrally with an attachment portion of the heatsink 18, that carries out an input and output of a signal between the voltage regulator 19 and the like and an external device (not shown). The rectifying device 21, which is disposed on the rear side of the rear bracket 3 and rectifies the alternating current voltage generated in the stator 12 to direct current voltage. A protective cover 25 wherein a peripheral wall portion 27 is mounted on the rear bracket 3 so as to cover the brush holder 17, voltage regulator 19, and rectifying device 21 (refer to FIG. 2).

The rotor 8 is a Lundell type rotor, and includes a field winding 9, through which an exciting current is caused to flow and which generates magnetic flux, and a pole core 10, provided so as to cover the field winding 9, in which a magnetic pole is formed by the magnetic flux of the field winding 9. The stator 12 includes a cylindrical stator core 13, and a stator winding 14, wound in the stator core 13, in which alternating current is generated by a change in the magnetic flux from the field winding 9 accompanying rotation of the stator 8. The stator 12 is disposed so as to enclose the rotor 8, with the stator core 13 gripped from both axial direction sides in opened ends of the front bracket 2 and rear bracket 3.

Also, as shown in the perspective view of the rectifying device 21 in FIG. 3, the rectifying device 21 includes a positive electrode side heatsink 22 on which a multiple of positive electrode side rectifying elements 22a are mounted, a negative electrode side heatsink 23 on which a multiple of negative electrode side rectifying elements 23a are mounted, and a terminal block 24 (including configurations of a tubular member 24a and stopper portions 24b and 24c), and is configured in an approximate C-form wherein a main body portion of the terminal block 24 is sandwiched between the positive electrode side heatsink 22 and negative electrode side heatsink 23. Further, the positive electrode side rectifying elements 22a and negative electrode side rectifying elements 23a are connected so as to configure a predetermined bridge circuit via the terminal block 24.

The rectifying device 21 configured in this way is disposed in a fan form centered on the shaft 6, in a plane perpendicular to the axial center of the shaft 6, on an outer peripheral side of the slip ring 15, and fixed tightly to an outer side end face of the kind of rear bracket 3 shown in FIG. 4. Further, a lead 14a of the stator winding 14 is drawn out from the rear bracket 3 and connected to a terminal of the terminal block 24, whereby the rectifying device 21 and stator winding 14 are electrically connected. Also, the brush holder 17 is disposed between leading ends of the approximate C-form of the rectifying device 21, and tightly fixed to an outer side end face of the rear bracket 3.

Next, using FIG. 2, a configuration of the protective cover 25 mounted on the rear bracket 3 will be described. The protective cover 25 is molded into a bottomed tubular form formed of a bottom portion 26 and tubular peripheral wall portion 27, using an insulating resin such as polybutylene terephthalate (PBT), nylon 66, or the like, and a multiple of intake holes 28 through which external air is taken into a generator are disposed in the bottom portion 26.

The vehicle-use rotating electric machine 1 configured in this way is such that a magnetic flux is generated by a field current being supplied from a battery (not shown) to the field coil 9 via the brush 16 and slip ring 15. N poles and S poles are alternately formed by the magnetic flux in a circumferential direction on an outer periphery of the pole core 10.

Meanwhile, engine rotation torque is transmitted via a belt (not shown) and the pulley 7 to the shaft 6, whereby the rotor 8 is rotated. Therefore, a rotating field is applied to the stator winding 14 of the stator 12, whereby electromotive force is generated in the stator winding 14. Further, electromotive force of alternating current generated in the stator winding 14 is rectified to direct current by the rectifying device 21, and the magnitude of output voltage thereof is regulated by the voltage regulator 19 and supplied to the battery or a vehicle-mounted electrical load.

Also, the fan 11 rotates in conjunction with the rotation of the rotor 8, external air is sucked into the protective cover 25 from the intake hole 28, and after cooling the heatsink 18 and the positive electrode side heatsink 22 and negative electrode side heatsink 23 of the rectifying device 21, the cooling air flows into the rear bracket 3. Further, external air flowing as far as a vicinity of the fan 11 is deviated in a centrifugal direction by the fan 11, cools a coil end of the stator winding 14, and is discharged to the exterior. The above is an outline of the configuration of the vehicle-use rotating electric machine 1.

Next, a description will be given of structures of the rectifying device 21 and terminal block 24 thereof, and of the rear bracket 3 and through holes 3a and 3b thereof, which are characteristic portions of the invention.

As shown in the perspective view of the rectifying device 21 in FIG. 3, a tubular member (or tubular region) 24a for guiding the lead 14a drawn out from the winding of the stator 12 to an appropriate position is disposed in the terminal block 24 of the rectifying device 21 when assembling. Further, the stopper portion 24b, which seals the through hole 3a of the rear bracket 3, is disposed in place of the tubular member 24a in a portion from which the lead 14a is eliminated due to a change in specifications, or the like. The stopper portion 24c sealing the through hole 3b, whose aperture form differs from that of the through hole 3a, is described in a following second embodiment.

As shown in the perspective view of the rear bracket 3 in FIG. 4, the through holes 3a and 3b, for inserting the tubular member 24a of the terminal block 24 of the rectifying device 21, are opened in the rear bracket 3. Herein, the through hole 3a is an aperture portion for one lead 14a to be inserted through, while the through hole 3b is an aperture portion for a multiple of neighboring leads 14a to be inserted through. In this example, the through hole 3b is opened to a size sufficient for two tubular members 24a to be inserted through.

Figure 5:
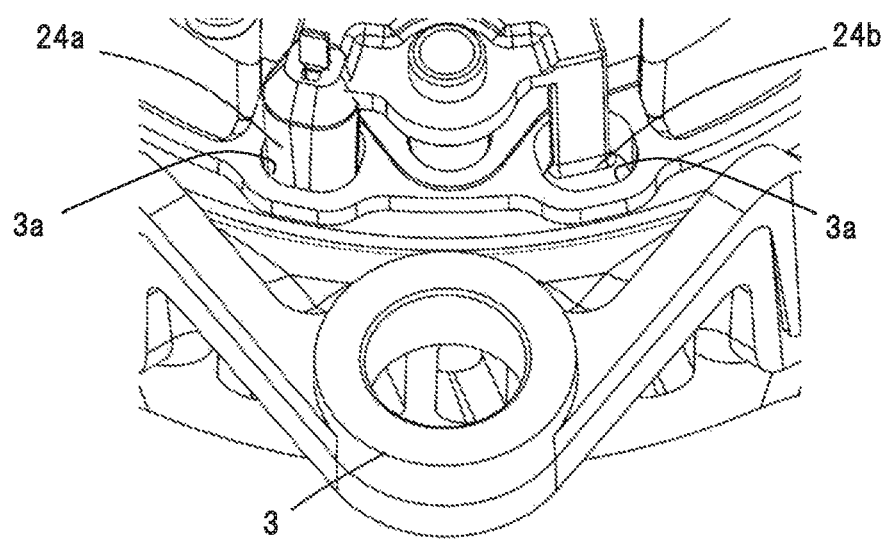
FIG. 5 is a main portion enlarged perspective view showing a state of the vehicle-use rotating electric machine according to the first embodiment of the invention wherein a tubular member and stopper portion of a terminal block of the rectifying device are inserted in the casing.

FIG. 5 shows a main portion enlarged perspective view wherein the tubular member 24a and stopper portion 24b of the terminal block 24 of the rectifying device 21 are inserted one each into two separated through holes 3a of the rear bracket 3. As shown in FIG. 5, the stopper portion 24b is inserted in place of the tubular member 24a into the through hole 3a in a place from which the lead 14a has been eliminated, thereby sealing the through hole 3a.

Figure 6:
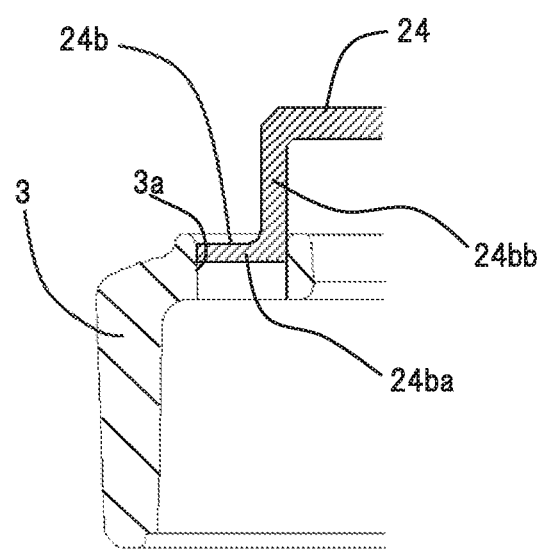
FIG. 6 is a sectional side view showing a state of the vehicle-use rotating electric machine according to the first embodiment of the invention wherein the stopper portion of the terminal block of the rectifying device is inserted into a through hole of the casing.

FIG. 6 is a sectional side view showing a state wherein the stopper portion 24b extended from a main body portion of the terminal block 24 of the rectifying device 21 is inserted into the through hole 3a of the rear bracket 3. Herein, for example, the stopper portion 24b is configured of a flat plate portion 24ba, extended from the main body portion of the terminal block 24 and having a vertical face with respect to the axis, and a coupling portion 24bb, which links the main body portion of the terminal block 24 and flat plate portion 24ba and extends in an axial direction along a through hole inner wall face, as shown in FIG. 6. As it is sufficient in the example of FIG. 6 that the flat plate portion 24ba of the stopper portion 24b is disposed so as to be able to seal the through hole 3a, no reference is made to an axial direction disposition (height).

Further, the terminal block 24 of the rectifying device 21 has a main body portion (a majority is sandwiched between heatsinks and hidden) of an approximate C-form for coupling various portions, the tubular member 24a extended from the main body portion, and the stopper portion 24b extended from the main body portion in a position distanced from the tubular member 24a. In a state wherein the rectifying device 21 and rear bracket 3 are assembled, the tubular member 24a of the terminal block 24 is inserted into a corresponding through hole 3a of the rear bracket 3, and the stopper portion 24b extended from the terminal block 24 is inserted into another corresponding through hole 3a of the rear bracket 3, whereby the tubular member 24a and stopper portion 24b cooperate in sealing the through holes 3a.

By the stopper portion 24b extended from the terminal block 24 being inserted in the through hole 3a positioned in the corresponding portion of the rear bracket 3 and sealing the through hole 3a, as heretofore described, cooling air sucked into the device can be prevented from leaking or flowing backward from the through hole 3a.

Figure 7:
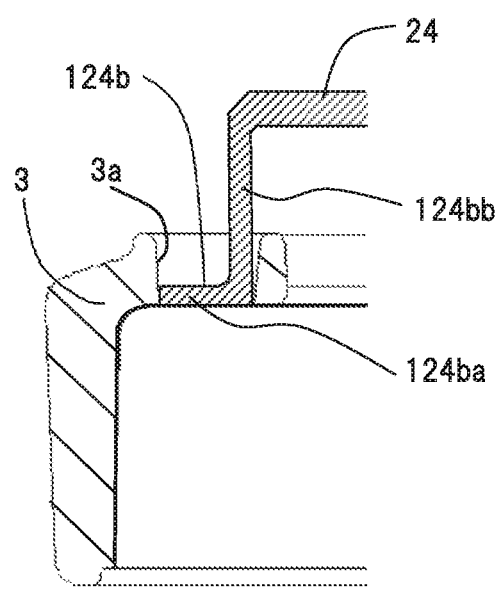
FIG. 7 is a sectional side view showing a state of the vehicle-use rotating electric machine according to the first embodiment of the invention wherein the stopper portion of the terminal block of the rectifying device is inserted into the through hole of the casing.

FIG. 7 is the same kind of sectional side view as FIG. 6, but a structure is such that a position of a flat face of a flat plate portion 124ba of a stopper portion 124b extended from a main body portion of the terminal block 24 is adjusted so that the flat face of the flat plate portion 124ba is in approximately the same plane as an inner axial end face of the rear bracket 3, which forms a face opposing a blade of the fan 11. It goes without saying that the form of a coupling portion 124bb, which links the main body portion of the terminal block 24 and the flat plate portion 124*ba*, is adjusted in accordance with the height of the flat plate portion 124*ba*.

Figure 8:
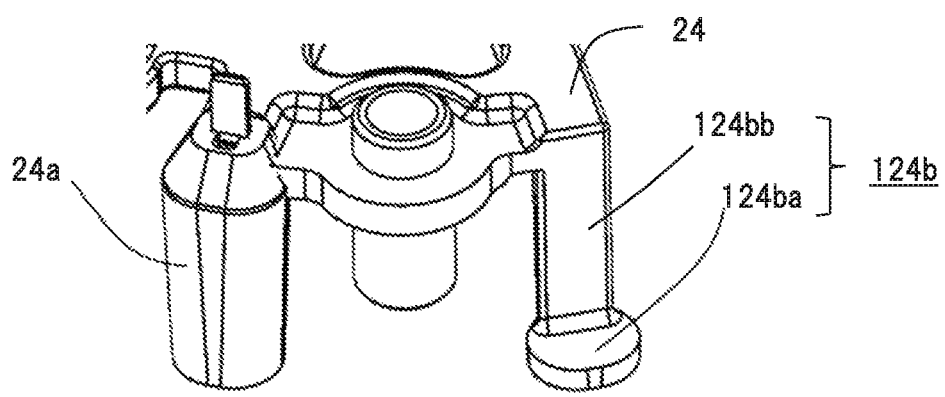
FIG. 8 is a perspective view showing an example of the vehicle-use rotating electric machine according to the first embodiment of the invention wherein the tubular member and stopper portion extended from a main body portion of the terminal block of the rectifying device are disposed distanced.

Also, the stopper portion 124*b* shown in FIG. 7 is extended from the main body portion of the terminal block 24 in a position independent from the tubular member 24*a* of the terminal block 24 of the rectifying device 21, as shown in a perspective view in FIG. 8. Further, not only is an end face of the tubular member 24*a* on a lower side in the paper plane in FIG. 8 arranged so as to be in approximately the same plane as the inner axial end face of the rear bracket 3, but also an end face of the flat plate portion 124*ba* of the stopper portion 124*b* is arranged so as to be in approximately the same plane as the inner axial end face of the rear bracket 3 that forms the face opposing the blade of the fan 11 of FIG. 7, whereby the blade-opposing face is of a flat form overall, because of which noise generated by rotation of the fan 11 can be restricted.

Figure 13:
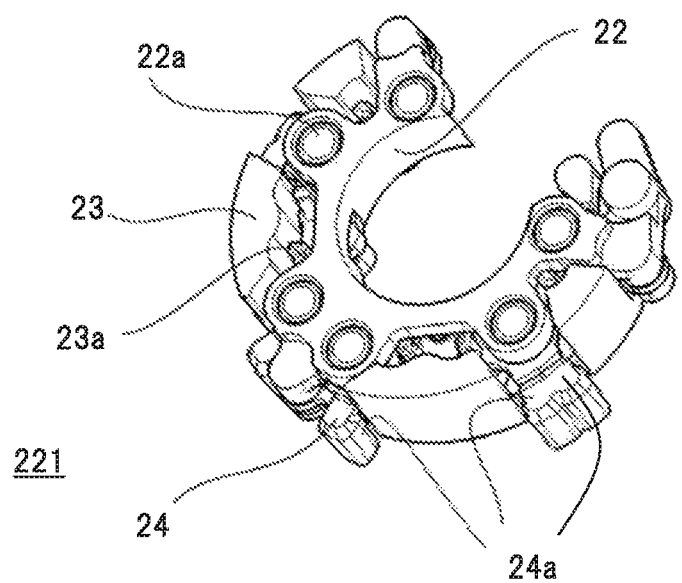
FIG. 13 is a perspective view showing as a comparison example a rectifying device when all through holes of a casing are blocked by a tubular member of a terminal block.

FIG. 13 is a perspective view of a rectifying device 221 shown as a comparison example, and shows an aspect when all the through holes 3*a* and 3*b* of the rear bracket 3 are blocked by the tubular member 24*a* of the terminal block 24. The comparison example of FIG. 13 shows a case wherein the number of drawn out leads 14*a* is greater than in the invention. According to the technology of the first embodiment of the invention, the rear bracket 3 can be commonly used, without changing the forms of the through holes 3*a* and 3*b* formed in the rear bracket 3, simply by adopting a configuration wherein the tubular members 24*a* of FIG. 13 are partially changed to the stopper portion 24*b* (or stopper portion 124*b*) when changing specifications to reduce the number of leads.

In this way, the vehicle-use rotating electric machine 1 according to the invention is such that the terminal block 24 configuring the rectifying device 21 has the tubular member 24*a* and stopper portion 24*b*, which are extended from the main body portion of the terminal block 24, inserted into each of the multiple of through holes 3*a* formed in the rear bracket 3, and cooperate in sealing the multiple of through holes 3*a*. Further, the structure is such that the tubular member 24*a* covers the periphery of the lead 14*a* of the stator winding 14 inserted in the through hole 3*a* and guides the insertion of the lead 14*a*, and the stopper portion 24*b* seals a region of the through hole 3*a* of the casing 4 not blocked by the tubular member 24*a*.

Because of this, when the number of leads 14*a* is reduced, the rear bracket 3 is used in common without changing the form thereof, and the through hole 3*a* of the rear bracket 3 can be sealed by changing the form of the terminal block 24 as heretofore described and forming the stopper portion 24*b* or 124*b* in a portion corresponding to a portion from which a lead has been eliminated, whereby cooling air is prevented from leaking or flowing backward from the through hole 3*a*, and cooling performance can be secured as designed.

By employing a structure such that the through hole 3*a* of the rear bracket 3 is blocked by the flat plate portion 24*ba* (or 124*ba*) of the stopper portion 24*b* (or 124*b*) of the terminal block 24, the rear bracket 3 in which the through hole 3*a* is formed can be used even after a change in specifications, regardless of the number of leads 14*a* drawn out from the stator winding 14. Further, as there is no need to block the through hole 3*a* of the rear bracket 3 by overlaying or the like, the weight of the rear bracket 3, and of a product including the rear bracket 3, can be reduced compared with when blocking the through hole 3*a* by overlaying.

Also, as heretofore described, a product having specifications wherein the number of leads 14*a* drawn out from the stator winding 14 is reduced is also such that the rear bracket 3 having the specifications before the number of leads 14*a* is reduced can be used, and the rear bracket 3 can be commonly used, that is, standardized, regardless of the number of leads 14*a*.

Furthermore, the vehicle-use rotating electric machine 1 according to the invention is such that the stopper portion 24*b* (or 124*b*) of the terminal block 24 is disposed distanced from the tubular member 24*a* of the terminal block 24, because of which two through holes 3*a* provided distanced from each other in the rear bracket 3 can be sealed one each by the stopper portion 24*b* and tubular member 24*a*.

Also, the vehicle-use rotating electric machine 1 according to the invention is such that the stopper portion 124*b* of the terminal block 24 is disposed on an end face on the rotor 8 side of the through hole 3*a* opened in the rear bracket 3 (one portion of the casing 4), and a surface of the stopper portion 124*b* is disposed along an inner face on the rotor 8 side of the casing 4. Because of this, an irregularity in the through hole 3*a* portion of the inner face of the casing 4 that forms the face opposing the blade of the fan 11 is eliminated, whereby the blade-opposing face can be of a flat form overall. Because of this, noise of the fan 11, which rotates in accompaniment to rotation of the rotor 8, can be reduced.

Furthermore, the vehicle-use rotating electric machine 1 according to the invention is such that the stopper portion 24*b* (or 124*b*) of the terminal block 24 has the flat plate portion 24*ba* (or 124*ba*) having a face perpendicular to the axis. Further, by the flat plate portion 24*ba* being a plate-form member that is as thin as possible while maintaining strength, material necessary for sealing the through hole 3*a* can be kept to a minimum. When, provisionally, using the rear bracket 3 in a form such that the remaining through hole 3*a* is blocked by overlaying, the product weight increases by the weight of the material needed for the blocking, and material expenses are added, because of which there is a problem in terms of reducing weight and manufacturing cost, but by the flat plate portion 24*ba* of the stopper portion 24*b* of the invention being of a thin plate structure, the problem can be resolved, manufacturing cost is reduced, and at the same time, the product weight can be reduced.

Also, the vehicle-use rotating electric machine 1 according to the invention is such that the stopper portion 24*b* (or 124*b*) of the terminal block 24 has the coupling portion 24*bb* (or 124*bb*) that connects the main body portion of the terminal block 24 and the flat plate portion 24*ba* (or 124*ba*) and extends in the axial direction, because of which a surface of the flat plate portion 24*ba* can be disposed in an appropriate position by adjusting the length of the coupling portion 24*bb*.

Second Embodiment

FIG. 9, FIG. 10, FIG. 11, and FIG. 12 are diagrams showing the vehicle-use rotating electric machine 1 of a second embodiment of the invention, and are diagrams corresponding to FIG. 5, FIG. 6, FIG. 7, and FIG. 8 respectively of the first embodiment. A form of the stopper portion 24*b* (or 124*b*) corresponding to the through hole 3*a* of the rear bracket 3, wherein the supposed number of leads 14*a* drawn out is one, is shown as an example in the first embodiment, but in the second embodiment, a description will be given of a structure of the stopper portion 24*c* (or 124c) of the terminal block 24 corresponding to the through hole 3b of the rear bracket 3 of FIG. 4, wherein the number of leads drawn out is two.

Figure 9:
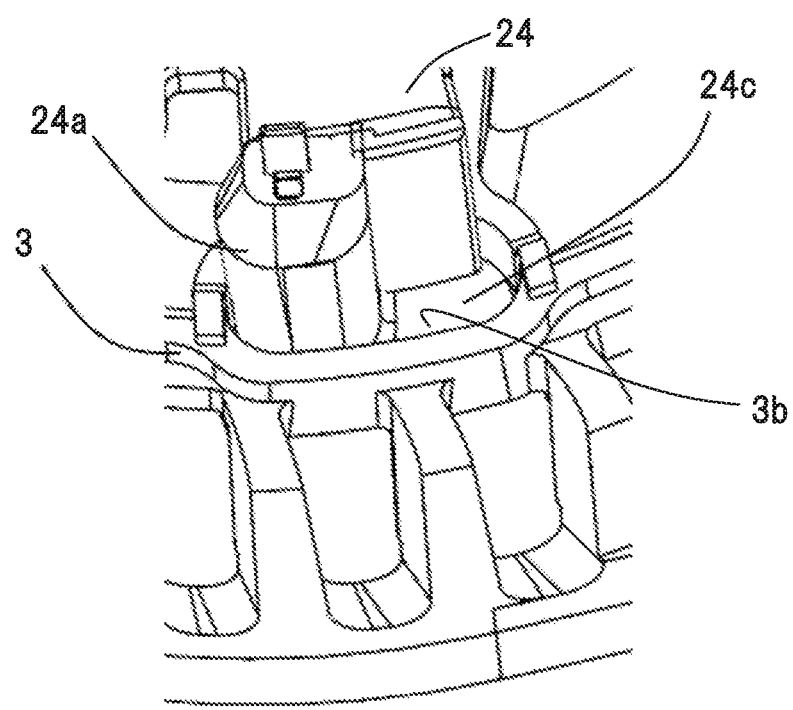
FIG. 9 is a main portion enlarged perspective view showing a state of the vehicle-use rotating electric machine according to a second embodiment of the invention wherein the tubular member and a stopper portion of the terminal block of the rectifying device are inserted in the casing.
Figure 12:
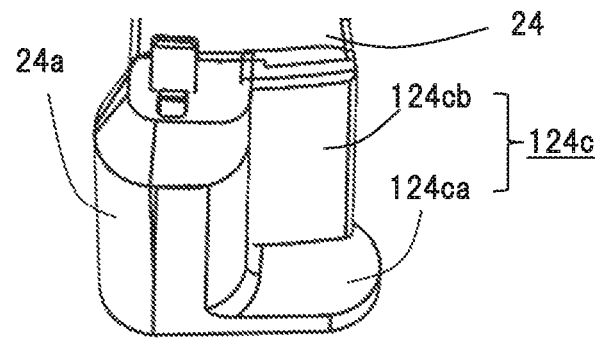
FIG. 12 is a perspective view showing an example of the vehicle-use rotating electric machine according to the second embodiment of the invention wherein the tubular member and stopper portion extended from a main body portion of the terminal block of the rectifying device are disposed so as to form an integrated structure.

In the second embodiment, as shown in FIG. 3, FIG. 9, and FIG. 12, the stopper portion 24c extended from the terminal block 24 of the rectifying device 21 is disposed so as to be in contact with one tubular member 24a, thereby forming an integrated structure with the tubular member 24a. In a state wherein the rectifying device 21 is mounted on the rear bracket 3, the tubular member 24a of the terminal block 24 is inserted in a region forming one-half of the through hole 3b of the rear bracket 3, and the stopper portion 24c extended from the terminal block 24 seals a region forming the remaining one-half of the through hole 3b, as shown in FIG. 9. Herein, for example, the stopper portion 24c is configured of a flat plate portion 24ca, of which a flat face portion is disposed in a radial direction of the axis, and a coupling portion 24cb that links the main body portion of the terminal block 24 and flat plate portion 24ca.

Figure 10:
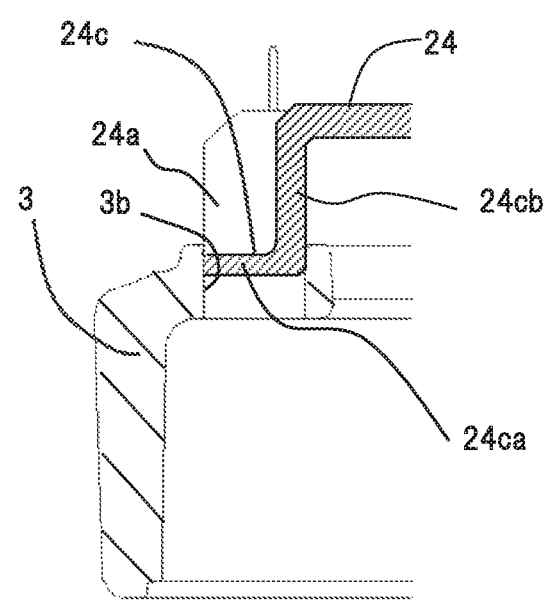
FIG. 10 is a sectional side view showing a state of the vehicle-use rotating electric machine according to the second embodiment of the invention wherein the stopper portion of the terminal block of the rectifying device is inserted into a through hole of the casing.

As shown in the second embodiment, the elliptical through hole 3b opened in the rear bracket 3 in accordance with specifications whereby two leads 14a are drawn out can be sealed by the member wherein the tubular member 24a and stopper portion 24c form an integrated structure. That is, the through hole 3b can also be sealed by cooperation between the tubular member 24a and stopper portion 24c. A sectional side view of this sealing state is shown in FIG. 10.

Figure 11:
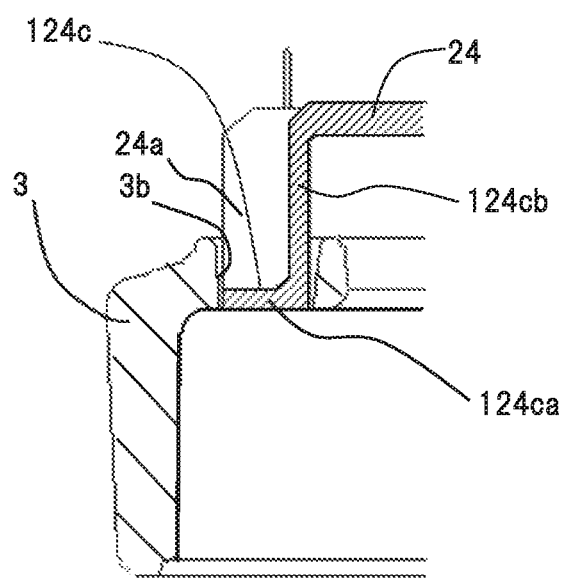
FIG. 11 is a sectional side view showing a state of the vehicle-use rotating electric machine according to the second embodiment of the invention wherein the stopper portion of the terminal block of the rectifying device is inserted into the through hole of the casing.

Also, a sectional side view of FIG. 11 shows an example wherein the height of a flat plate portion 124ca of the stopper portion 24c is regulated by the length of a coupling portion 124cb, and an end face of the flat plate portion 124ca is aligned with an inner face of the rear bracket 3 and an end face of the tubular member 24a. The stopper portion 124c integrated with the tubular member 24a of the terminal block 24, in the same way as the stopper portion 124b of the first embodiment, is of a configuration such that the flat plate portion 124ca extending in a radial direction is disposed so as to be in approximately the same plane as an inner axial end face of the rear bracket 3, which forms a face opposing the blade of the fan 11, whereby noise of the fan 11 can be reduced further than when not carrying out height regulation of the flat plate portion 124ca.

FIG. 12 is a main portion enlarged perspective view of the terminal block 24, but a structure is such that the flat plate portion 124ca configuring the stopper portion 124c is coupled to the main body portion of the terminal block 24 via the coupling portion 124cb, and furthermore, a flat face portion of the flat plate portion 124ca is coupled to a lower end portion of the tubular member 24a, an end portion along the axis of the coupling portion 124cb and a tubular member 24a side face portion are coupled, and the flat plate portion 124ca is supported by the coupling portion 124cb and tubular member 24a (the same applies to the stopper portion 24c). Therefore, a support structure more stable than the stopper portion 24b extended independently from the terminal block 24, as in the first embodiment, is obtained.

The coupling portion 24cb (or 124cb) is shown in the examples of FIG. 9 to FIG. 12, but by adopting a structure wherein the flat plate portion 24ca (or 124ca) is extended from a bottom face portion side face of the tubular member 24a, the stopper portion 24c (or 124c) can be configured so as not to have the coupling portion 24cb (or 124cb).

The stopper portion 24c (or 124c) according to the second embodiment can easily be designed integrally with the tubular member 24a, and parts can be commonly used by changing the form of the terminal block 24 so that one portion is replaced with the stopper portion 24c (or 124c) in accordance with a reduction in the number of leads 14a drawn out from the through hole 3b, without changing the form of the elliptical through hole 3b of the rear bracket 3.

The stopper portions 24b and 124b of the first embodiment, and stopper portions 24c and 124c of the second embodiment, of the present proposal can all be formed integrally with the terminal block 24, and no additional part is necessary. Therefore, a generator with a higher performance can be obtained with a simple configuration.

In the first embodiment and second embodiment, a description is given of a case wherein the vehicle-use rotating electric machine 1 is a vehicle-use alternating current generator, but this is only one example. The vehicle-use rotating electric machine 1 of the invention not being limited to a vehicle-use alternating current generator, the same advantages are achieved when applied to a rotating electric machine such as a vehicle-use motor or vehicle-use generator motor.

The embodiments of the invention can be freely combined, and each embodiment can be modified or abbreviated as appropriate, without departing from the scope of the invention.

The invention claimed is:

1. A vehicle-use rotating electric machine, comprising:
   a rotor rotatably supported inside a casing;
   a stator supported by the casing and disposed so as to enclose the rotor, and
   a rectifying device, disposed on an outer side on one axial direction side of the casing, that rectifies alternating current power generated in the stator, wherein
   the rectifying device has a terminal block necessary for electrical connection with a stator winding configuring the stator,
   the terminal block comprises a tubular member extended from a main body portion of the terminal block and inserted in a first through hole formed in the casing and a stopper portion extended from the main body portion of the terminal block and inserted in a second through hole formed in the casing, thereby sealing the first and second through holes,
   the tubular member covers a periphery of a lead of the stator winding inserted through the first through hole and guides an insertion of the lead, and
   the stopper portion seals a region of the second through hole of the casing not blocked by the tubular member.

2. The vehicle-use rotating electric machine according to claim 1, wherein the stopper portion of the terminal block is disposed distanced from the tubular member of the terminal block.

3. The vehicle-use rotating electric machine according to claim 1, wherein the stopper portion of the terminal block is disposed on an end face of the casing on the rotor side of the second through hole, and a surface of the stopper portion is disposed along an inner face on the rotor side of the casing.

4. The vehicle-use rotating electric machine according to claim 1, wherein the stopper portion of the terminal block has a flat plate portion having a face perpendicular to an axis of rotation of the vehicle-use rotating electric machine.

5. The vehicle-use rotating electric machine according to claim 4, wherein the stopper portion of the terminal block has a coupling portion extending in an axial direction and connecting a main body portion of the terminal block and the flat plate portion.

6. A vehicle-use rotating electric machine, comprising:
   a rotor rotatably supported inside a casing;
   a stator supported by the casing and disposed so as to enclose the rotor; and a rectifying device, disposed on an outer side on one axial direction side of the casing, that rectifies alternating current power generated in the stator, wherein the rectifying device has a terminal block necessary for electrical connection with a stator winding configuring the stator, the terminal block has a tubular member and stopper portion extended from a main body portion of the terminal block and inserted in a through hole formed in the casing, thereby sealing the through hole in cooperation, the tubular member occupying a first portion of the through hole and the stopper portion occupying a second portion of the through hole located adjacent to the first portion in a circumferential direction of the vehicle-use rotating electric machine, the tubular member covers a periphery of a lead of the stator winding inserted through the through hole and guides an insertion of the lead, and the stopper portion seals the second portion of the through hole of the casing not blocked by the tubular member.

7. The vehicle-use rotating electric machine according to claim 6, wherein the stopper portion of the terminal block is disposed so as to form an integrated structure in contact with the tubular member of the terminal block.

8. The vehicle-use rotating electric machine according to claim 6, wherein the stopper portion of the terminal block is disposed on an end face of the casing on the rotor side of the through hole, and a surface of the stopper portion is disposed along an inner face on the rotor side of the casing.

9. The vehicle-use rotating electric machine according to claim 6, wherein the stopper portion of the terminal block has a flat plate portion having a face perpendicular to an axis of rotation of the vehicle-use rotating electric machine.

10. The vehicle-use rotating electric machine according to claim 9, wherein the stopper portion of the terminal block has a coupling portion extending in an axial direction and connecting a main body portion of the terminal block and the flat plate portion.

* * * * *